(12) United States Patent
Kanai

(10) Patent No.: US 7,761,780 B2
(45) Date of Patent: Jul. 20, 2010

(54) METHOD, APPARATUS, AND SYSTEM FOR PROTECTING MEMORY

(75) Inventor: Tatsunori Kanai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 809 days.

(21) Appl. No.: 11/603,037

(22) Filed: Nov. 22, 2006

(65) Prior Publication Data

US 2007/0124557 A1    May 31, 2007

(30) Foreign Application Priority Data

Nov. 28, 2005    (JP)    ............................. 2005-342135

(51) Int. Cl.
*G06F 11/10* (2006.01)
(52) U.S. Cl. ...................... 714/805; 711/164
(58) Field of Classification Search ................. 714/805; 711/164
See application file for complete search history.

(56) References Cited

U.S. PATENT DOCUMENTS

| | | | | |
|---|---|---|---|---|
| 5,140,685 | A * | 8/1992 | Sipple et al. | ................. 711/164 |
| 5,226,137 | A * | 7/1993 | Bolan et al. | .................. 711/164 |
| 6,731,536 | B1 * | 5/2004 | McClain et al. | ........ 365/185.04 |
| 7,577,809 | B2 * | 8/2009 | Bruner et al. | ............... 711/163 |
| 7,653,861 | B2 * | 1/2010 | Kanai et al. | .................. 714/758 |

FOREIGN PATENT DOCUMENTS

| JP | 59-188897 | 10/1984 |
|---|---|---|
| JP | 4-229346 | 8/1992 |
| JP | 2000-181802 | 6/2000 |
| JP | 2006-18685 | 1/2006 |

OTHER PUBLICATIONS

Blahut, "Algebraic Codes for Data Transmission," Cambridge University Press (2003), pp. 63.
Hsiao, "A Class of Optimal Minimum Odd-weight-column SEC-DED Codes," IBM J. Res. Develop. (Jul. 1970), pp. 395-401.
z/Architecture, "Principles of Operation," IBM, SA22-7832-00, pp. 3-9 to 3-12, (Dec. 2000).
Kanai, T. et al., "Access Control Apparatus, Access Control System, Processor, Access Control Method, Memory Access Control Apparatus, Memory Access Control System, And Memory Access Control Method," U.S. Appl. No. 11/523,003, filed Sep. 19, 2006.

(Continued)

*Primary Examiner*—Stephen M Baker
(74) *Attorney, Agent, or Firm*—Finnegan, Henderson, Farabow, Garrett & Dunner, L.L.P.

(57) ABSTRACT

A parity adder obtains a second data by adding a parity for first data to be written to a memory to the first data. An access-key register holds an access key unique to a source of request. A first operating unit obtains a third data by calculating an XOR between the second data and the access key, the access key being set by the source of request for writing data to the memory. A second operating unit obtains a fourth data by calculating an XOR between the access key and the third data. A syndrome calculator calculates a syndrome from the third data, the access key being set by the source of request for reading data from the memory. A determining unit determines whether to output the third data as the first data, based on calculated syndrome.

20 Claims, 16 Drawing Sheets

OTHER PUBLICATIONS

Kanai, T. et al., "Access Control Apparatus, Access Control System, Processor, Access Control Method, Memory Access Control Apparatus, Memory Access Control System, And Memory Access Control Method," U.S. Appl. No. 11/519,797, filed Sep. 13, 2006.

Decision of a Patent Grant issued by the Japanese Patent Office on Feb. 2, 2010, for Japanese Patent Application No. 2005-342135, and English-language translation thereof.

* cited by examiner

| READ-ACCESS KEY | MEMORY-START ADDRESS NUMBER |
|---|---|
| key a | a |
| key b | b |
| ⋮ | ⋮ |

|  | x63 x62 x61 ⋯ | $x_i$ | $x_{i-1}$ | ⋯⋯⋯ x2 x1 x0 |
|---|---|---|---|---|
| WORD W1 |  | a | 0 |  |
| WORD W2 |  | b | 1 |  |
| WORD W3 |  | 0 | c |  |
| WORD W4 |  | 1 | d |  |

METHOD, APPARATUS, AND SYSTEM FOR PROTECTING MEMORY

CROSS-REFERENCE TO RELATED APPLICATIONS

This application is based upon and claims the benefit of priority from the prior Japanese Patent Application No. 2005-342135, filed on Nov. 28, 2005; the entire contents of which are incorporated herein by reference.

BACKGROUND OF THE INVENTION

1. Field of the Invention

The present invention relates to a technology for protecting a memory from an unauthorized access.

2. Description of the Related Art

Computers take advantage of various resources such as a memory and a central processing unit (CPU) by using a multiprogramming system, which performs a plurality of processes such as programs, tasks, and jobs by switching among them.

Such a computer involves a risk that data in the memory used by a certain process can be accessed or overwritten by another process and damaged.

To protect the data from such a risk, z/Architecture Principles of Operation (IBM; SA22-7832-00; December 2000; pp. 3-9 to 3-12) discloses a typical technology of determining accessibility by prestoring a storage key with respect to each of predetermined size of memory region such as four kilobytes, and checking the storage key of a process with that of the memory to be accessed by the process.

However, a memory protection method that uses the storage keys requires a memory that stores therein the storage keys in addition to the memory that stores therein the data. Thus, the amount of hardware increases.

Moreover, because the data is protected by the unit of four-kilobyte page, protection of small data wastes some memory area that remains unused. Although the problem can be solved by assigning the storage keys by the smaller unit, the solution will require more memory to store the storage keys.

SUMMARY OF THE INVENTION

An apparatus for protecting a memory, according to one aspect of the present invention, includes a parity generator that generates a parity for first data to be written to the memory; a parity adder that obtains a second data by adding the parity to the first data; an access-key register that holds an access key unique to a source of request for writing data to the memory or for reading data from the memory, the access key being set by the source of request and being used for accessing the memory; a first operating unit that obtains a third data by calculating an XOR between the second data and the access key, the access key being set in the access-key register by the source of request for writing data to the memory; a writing unit that writes the third data to the memory; a second operating unit that obtains a fourth data by calculating an XOR between the access key and the third data, the access key being set in the access-key register by the source of request for reading data from the memory; a syndrome calculator that calculates a syndrome from the third data; and a determining unit that determines whether to output the third data as the first data, based on calculated syndrome.

A system for protecting a memory, according to another aspect of the present invention, includes a processor; a memory controller; and a memory protecting apparatus that protects an external memory. The memory protecting apparatus includes a parity generator that generates a parity of first data to be written to the memory; a parity adder that obtains a second data by adding the parity to the first data; an access-key register that holds an access key unique to a source of request for writing data to the memory, the access key being set by the source of request and being used for accessing the memory or for reading data from the memory; a first operating unit that obtains a third data by calculating an XOR between the second data and the access key, the access key being set in the access-key register by the source of request for writing data to the memory; a writing unit that writes the third data to the memory; a second operating unit that obtains a fourth data by calculating an XOR between the access key and the third data, the access key being set in the access-key register by a source of request for reading data from the memory; a syndrome calculator that calculates a syndrome from the third data; and a determining unit that determines whether to output the third data as the first data, based on calculated syndrome.

A system for protecting a memory, according to still another aspect of the present invention, includes a memory controller; and a memory protecting apparatus that protects an external memory. The memory protecting apparatus includes a parity generator that generates a parity of first data to be written to the memory; a parity adder that obtains a second data by adding the parity to the first data; an access-key register that holds an access key unique to a source of request for writing data to the memory or for reading data from the memory, the access key being set by the source of request and being used for accessing the memory; a first operating unit that obtains a third data by calculating an XOR between the second data and the access key, the access key being set in the access-key register by the source of request for writing data to the memory; a writing unit that writes the third data to the memory; a second operating unit that obtains a fourth data by calculating an XOR between the access key and the third data, the access key being set in the access-key register by a source of request for reading data from the memory; a syndrome calculator that calculates a syndrome from the third data; and a determining unit that determines whether to output the third data as the first data, based on calculated syndrome.

A system for protecting a memory, according to still another aspect of the present invention, includes a memory; and a memory protecting apparatus that protects the memory. The memory protecting apparatus includes a parity generator that generates a parity of first data to be written to the memory; a parity adder that obtains a second data by adding the parity to the first data; an access-key register that holds an access key unique to a source of request for writing data to the memory or for reading data from the memory, the access key being set by the source of request and being used for accessing the memory; a first operating unit that obtains a third data by calculating an XOR between the second data and the access key, the access key being set in the access-key register by the source of request for writing data to the memory; a writing unit that writes the third data to the memory; a second operating unit that obtains a fourth data by calculating an XOR between the access key and the third data, the access key being set in the access-key register by a source of request for reading data from the memory; a syndrome calculator that calculates a syndrome from the third data; and a determining unit that determines whether to output the third data as the first data, based on calculated syndrome.

A method of protecting a memory, according to still another aspect of the present invention, includes generating a parity for first data to be written to the memory; obtaining a second data by adding the parity to the first data; setting an access key unique to a source of request for writing data to the memory or for reading data from the memory in an access-key register, the access key being set by the source of request and being used for accessing the memory; obtaining a third data by calculating an XOR between the second data and the access key, the access key being set in the access-key register by the source of request for writing data to the memory; writing the third data to the memory; obtaining a fourth data by calculating an XOR between the access key and the third data, the access key being set in the access-key register by a source of request for reading data from the memory; calculating a syndrome from the third data; and determining whether to output the third data as the first data, based on calculated syndrome.

BRIEF DESCRIPTION OF THE DRAWINGS

FIG. 17 is a schematic for explaining a process performed by a data editing unit.

DETAILED DESCRIPTION OF THE INVENTION

Exemplary embodiments of the present invention are explained below in detail referring to the accompanying drawings. The present invention is not limited to the embodiments explained below.

Figure 1:
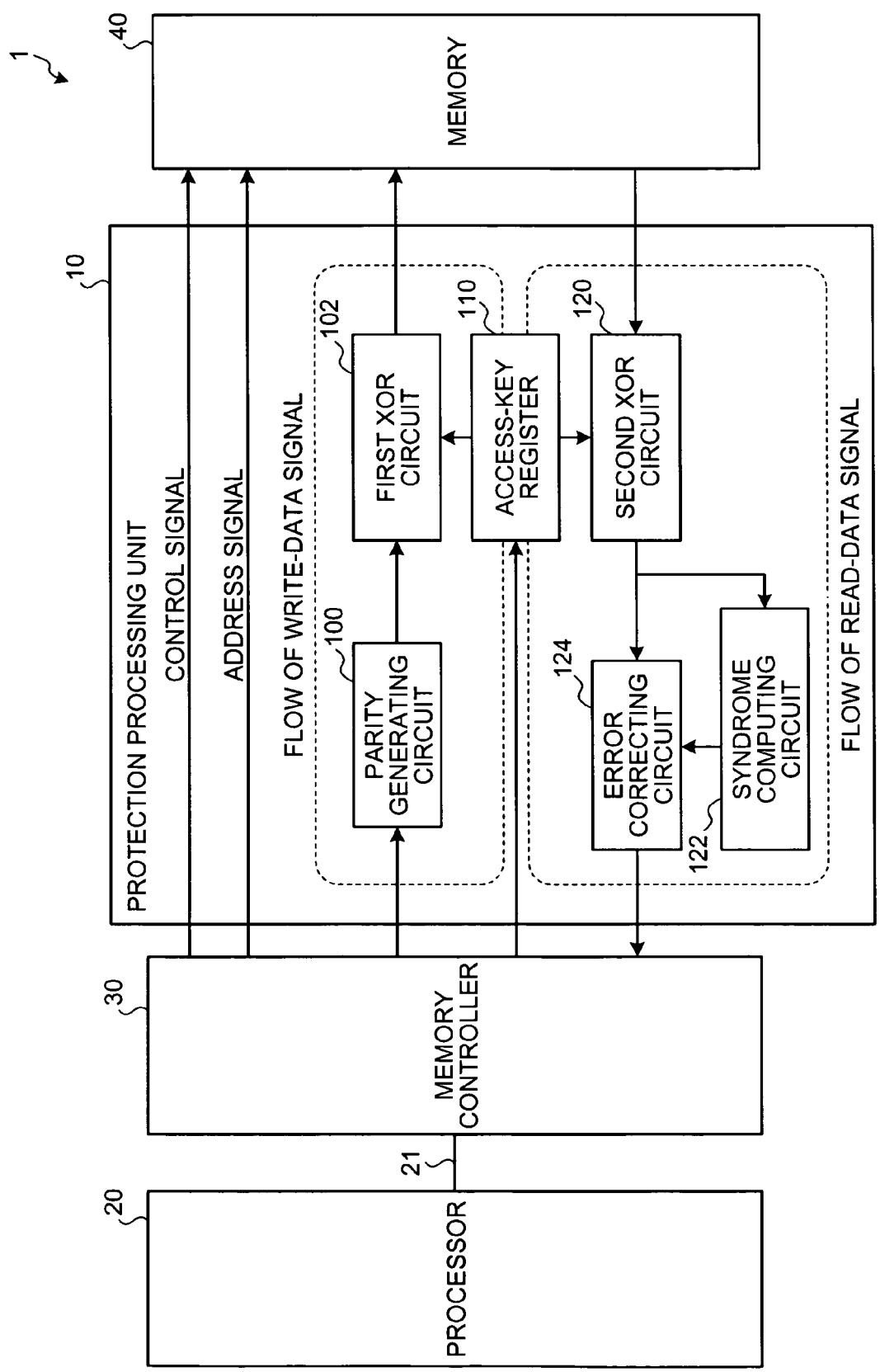
FIG. 1 is a block diagram of a memory protecting apparatus according to a first embodiment of the present invention.

As shown in FIG. 1, a memory protecting apparatus 1 according to a first embodiment of the present invention includes a protection processing unit 10, a processor 20, a memory controller 30, and a memory 40. The memory controller 30 and the processor 20 are connected via a processor bus 21. The protection processing unit 10 is an independent device installed between the memory controller 30 and the memory 40. More specifically, the protection processing unit 10 can be an independent large scale integration (LSI) chip.

The memory 40 includes an error correcting code, namely an error control code (ECC). The ECC is explained herein referring to FIGS. 2 and 3. The ECC has been widely used as a method of improving reliability of memories.

Figure 2:
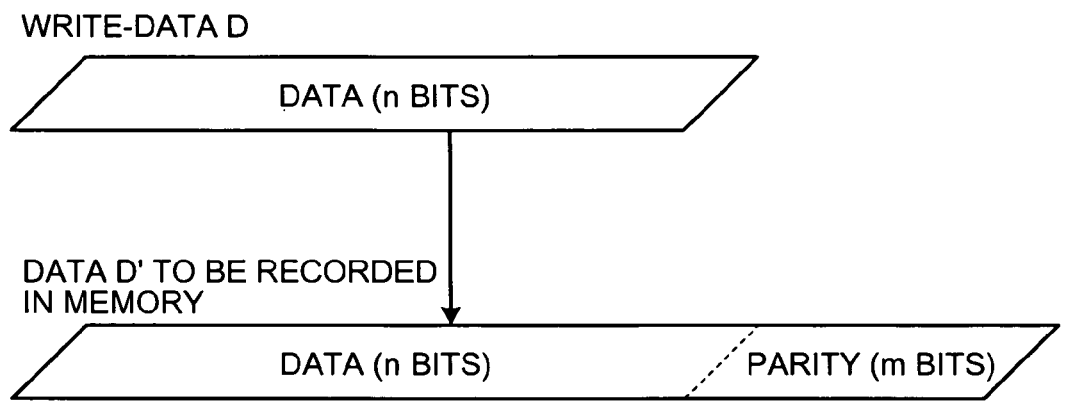
FIG. 2 is a schematic for explaining a process of writing data in a memory.

In general, as shown in FIG. 2, an n-bit data D to be read from or written to the memory at a time is added with an m-bit parity. The parity is calculated from the value of the data D. A data D' with the size of n+m bits is written to the memory.

Figure 3:
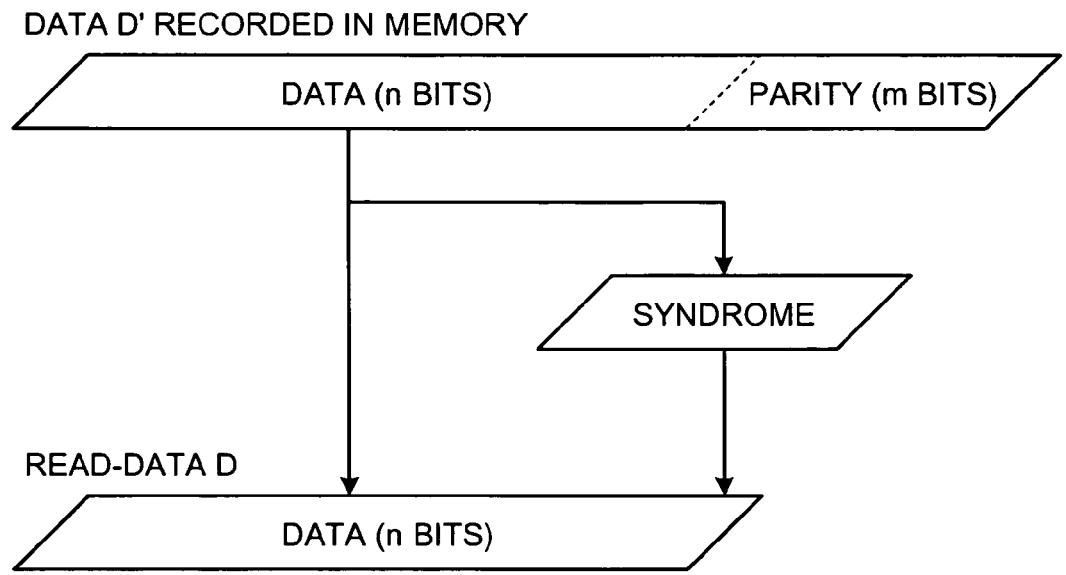
FIG. 3 is a schematic for explaining a process of reading the data from the memory.

As shown in FIG. 3, to read the data D' from the memory, the value of the m bits is calculated by multiplying the data D' by a transposed matrix in a parity check matrix H. The value of the m bits is referred to as a syndrome. When the syndrome is zero, the n-bit data is correct. When the syndrome is not zero, the n-bit data includes at least one error. The error is corrected if it is correctable.

The ECC can be performed in various methods. The number of parity bits, a method of calculating the number, a parity check matrix for calculating the syndrome, and a method of finding a bit location where the error is corrected based on the syndrome are different from method to method. A single error correcting, double error detecting (SEC-DED) code is widely used for memories in computer systems.

Based on the SEC-DED code, an error is located when the data or the parity thereof includes a single error. When the data or the parity thereof includes double errors, the errors are detected though they cannot be located.

Generally, a 32-bit data is added with a 7-bit parity as the ECC. A 64-bit data is added with an 8-bit parity, and a 128-bit data is added with a 9-bit parity.

The SEC-DED code can be performed in various methods depending on how to compute the parity and how to generate the parity check matrix. The most popular methods are an extended Hamming code and a Hsiao code. The extended Hamming code is described on page 63 of Algebraic Code for Data Transmission; Richard E. Blahut, 2003, Cambridge University Press. The Hsiao code is described on pages 395-401 of A Class of Optimal Minimum Odd-weight-column SEC-DED Codes; M. Y. Hsiao, IBM Journal of Research and Development, July 1970. The two SEC-DED codes are different in the methods of interpreting the value of the syndrome; however, they are equal in the ability of correcting and detecting errors.

Based on the SEC-DED code, the value of the syndrome is zero when the data is correct. When the data includes a single error, the syndrome indicates a value that is not zero and that corresponds to the error bit location one-to-one. The value is generally equal to the value of a row in the parity check matrix that corresponds to the error bit location.

At the same time, a value of a bit in the parity specified by the parity calculating method and the parity check matrix is always one based on the extended Hamming code, and the syndrome always includes an odd number of bits indicative of one based on the Hsiao code.

The value of the syndrome is not zero either when the data includes two errors. In this case, the value of the bit in the parity specified by the parity calculating method and the parity check matrix is always zero based on the extended Hamming code. The syndrome always includes an even number of bits indicative of one based on the Hsiao code.

When the SEC-DED code is used, a situation that the data includes more than two errors is generally not considered. This is because, as described below, data having three or more errors cannot be sometimes distinguished from data having an error or two.

When the data includes an odd number of errors equal to or more than three, the value of the bit in the parity specified by the parity calculating method and the parity check matrix is always one based on the extended Hamming code. Based on the Hsiao code, the syndrome always includes an odd number of bits indicative of one. These results are same as in the case of a single error. The results indicate that at least one error is included; however, it is difficult to determine whether there is a single error or more in many cases.

When the data includes an even number of errors equal to or more than four, the value of the bit in the parity specified by the parity calculating method and the parity check matrix is always zero based on the extended Hamming code. Based on the Hsiao code, the syndrome always includes an even number of bits indicative of one. The results are same as in the case of double errors.

However, while the syndrome never indicates zero in the case of double errors, sometimes the syndrome can indicate zero when there are four or more even number of errors. For this reason, there is a risk that no error is detected though errors are included.

The first embodiment is explained assuming that the SEC-DED code is used as the ECC. The SEC-DED code used herein is the Hsiao code. However, the extended Hamming code can be used otherwise. An ECC except the SEC-DED code can be also used.

Returning to the explanation of FIG. 1, the protection processing unit 10 realizes memory protection by storing the data overlapped with the ECC and information for the memory protection. Because the ECC is used, the unit of the memory protection is as small as 32 bits or 64 bits, which is equal to the unit of the ECC. As a result, the memory is protected by the smaller unit compared with the conventional technology.

The protection processing unit 10 includes a parity generating circuit 100, a first XOR circuit 102, an access-key register 110, a second XOR circuit 120, a syndrome calculating circuit 122, and an error correcting circuit 124.

The parity generating circuit 100 generates a parity for data acquired from the processor 20 via the memory controller 30, and adds the parity to the data. The access-key register 110 retains therein an access key set by a process that is operating in the processor 20. The access key is a key to access the memory 40.

An operating system that operates on the memory protecting apparatus 1 includes a function that switches among a plurality of programs to realize multiprogramming. The operating system manages correspondence between each process and an access key to it. The access key includes a value unique to the process. In other words, different processes have different access keys.

The first XOR circuit 102 calculates an XOR of the data that includes the parity generated by the parity generating circuit 100 and the access key retained in the access-key register 110. The first XOR circuit 102 then writes the result to the memory 40. In other words, the first XOR circuit 102 functions as a writing unit.

The second XOR circuit 120 calculates an XOR of data in the memory 40 and the access key retained in the access-key register 110. The syndrome calculating circuit 122 calculates the syndrome from the result of calculating by the second XOR circuit 120. The error correcting circuit 124 corrects an error as needed based on the value of the syndrome calculated by the syndrome calculating circuit 122. In other words, the error correcting circuit 124 functions as an output determining unit.

The memory controller 30 can include an ECC circuit. If it is the case, the protection processing unit 10 does not need to include the parity generating circuit 100, the syndrome calculating circuit 122, and the error correcting circuit 124. The ECC circuit in the memory controller 30 is used instead of them.

Figure 4:
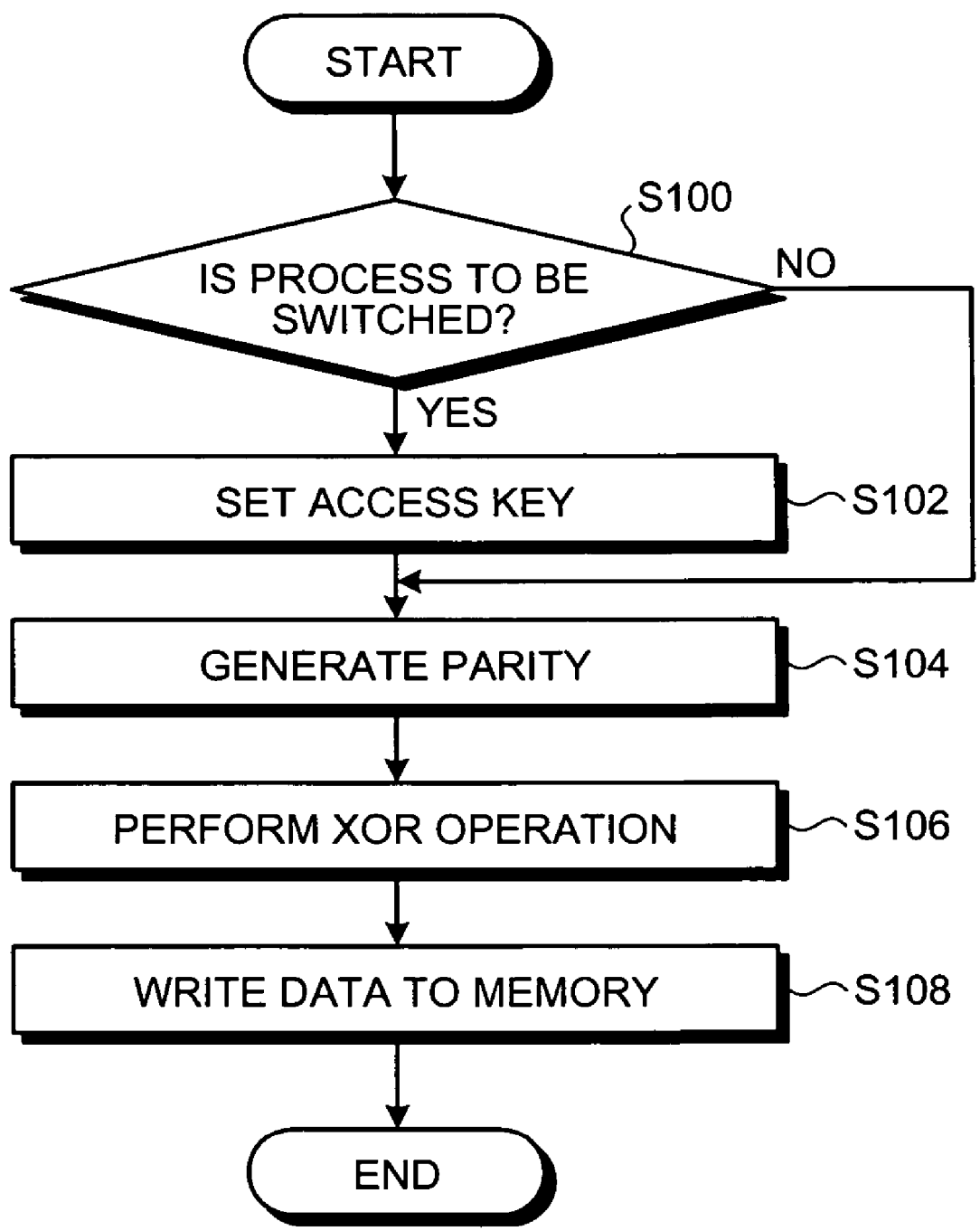
FIG. 4 is a flowchart of a process to write the data in the memory.

A process of writing the data to the memory 40 is explained referring to FIG. 4. To switch the process (YES at step S100), an access key after switching is set to the access-key register 110 (step S102).

The parity generating circuit 100 generates the parity and adds it to the data to be written to the memory 40 (step S104). The first XOR circuit 102 calculates the XOR of the data added with the parity and the access key retained in the access-key register 110 (step S106), and writes the calculated data to the memory 40 (step S108).

Figure 5:
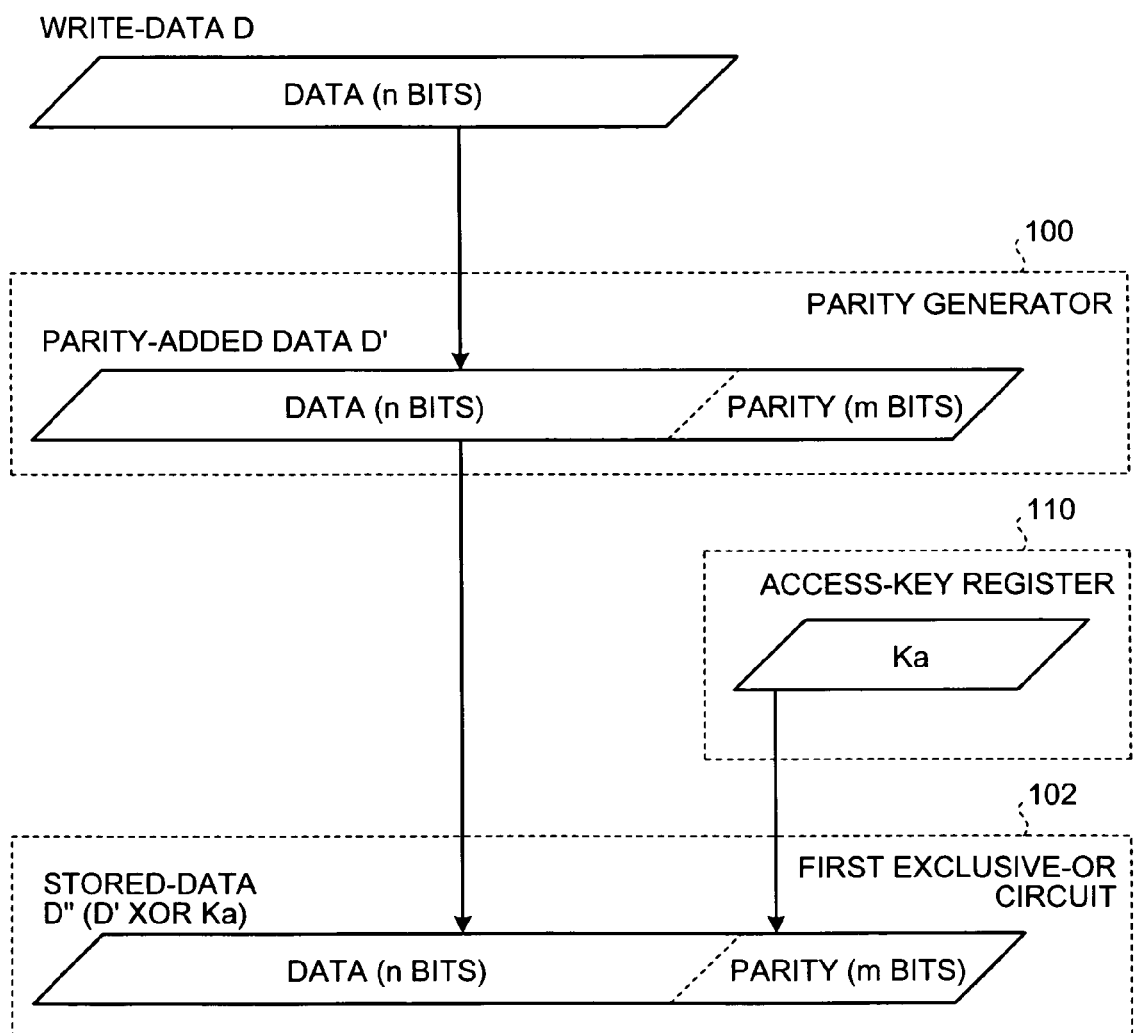
FIG. 5 is a schematic for explaining a flow of the data in a writing process.

As shown in FIG. 5, when the active process writes the data D to the memory 40, the ECC adds the parity to generate the parity-added data D'.

A value D' XOR Ka equal to an XOR of the parity-added data D' and the access key Ka written to the access-key register 110 by the process, namely a stored data D", is written to the memory 40.

Figure 6:
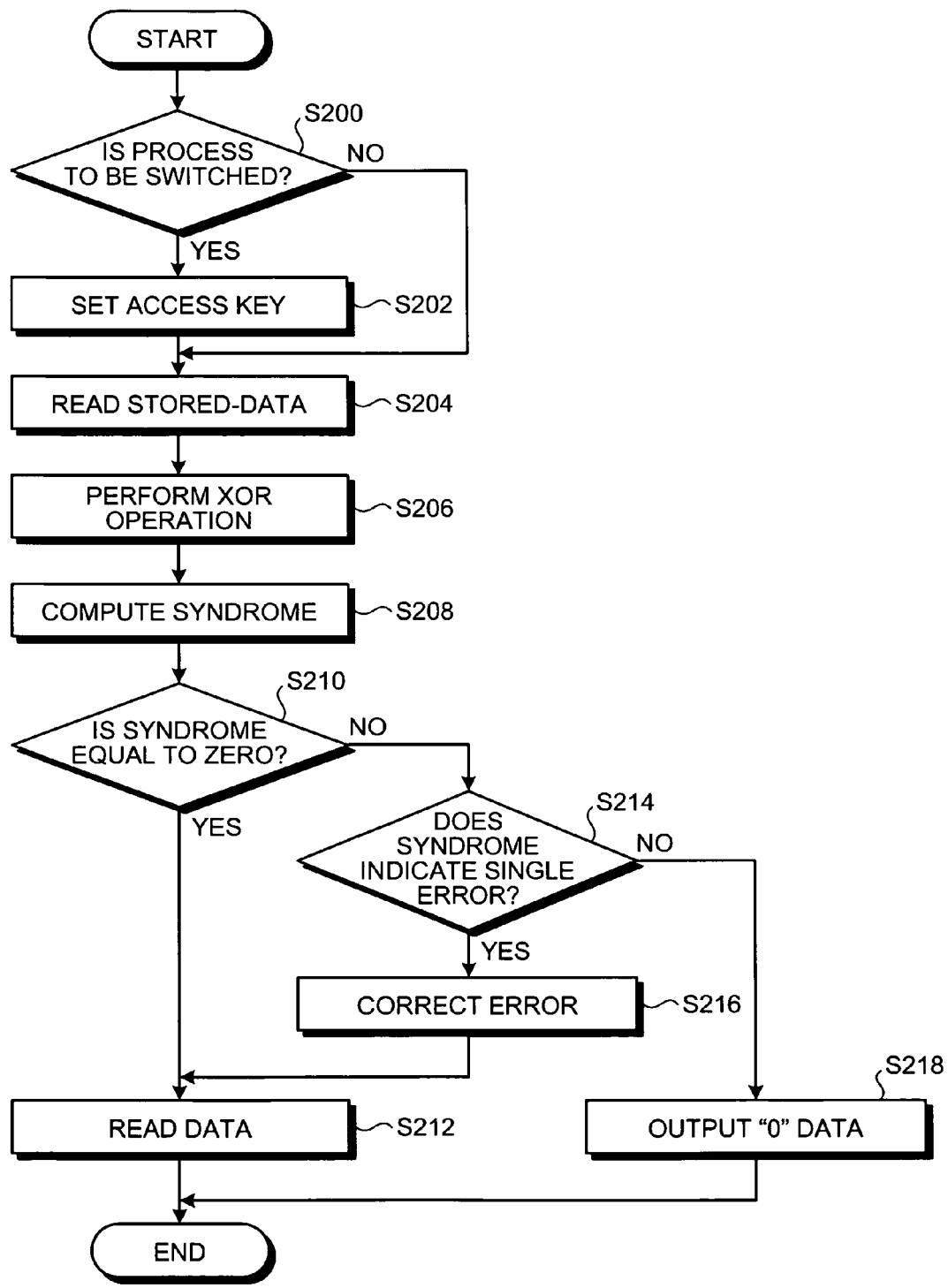
FIG. 6 is a flowchart of a process to read the data from the memory.

A process to read the data from the memory 40 is explained referring to FIG. 6. To switch the process (YES at step S200), the access key after switching is set to the access-key register 110 (step S202).

The second XOR circuit 120 reads the stored data D" from the memory 40 (step S204), and calculates the XOR of the stored data D" and the access key retained in the access-key register 110 (step S206).

The syndrome calculating circuit calculates the syndrome using the ECC (step S208). When the value of the syndrome is zero, i.e. when no error is detected (YES at step S210), the data D is read (step S212).

When a single error is detected (No at step S210 and YES at step S214), i.e. when the value of the syndrome is not zero, the number of bits indicative of one in the syndrome is odd, and the value of the syndrome is equal to any row in the parity check matrix, the error correcting circuit 124 corrects the error (step S216) and the corrected data D is read (step S212). When double errors are detected (NO at step S210 and NO at step S214), i.e. when the value of the syndrome is not zero and the number of bits indicative of one in the syndrome is even or when the number of bits indicative of one in the syndrome is odd and the value of the syndrome is different from any row in the parity check matrix, a zero data is output instead of the data D (step S218).

Figure 7:
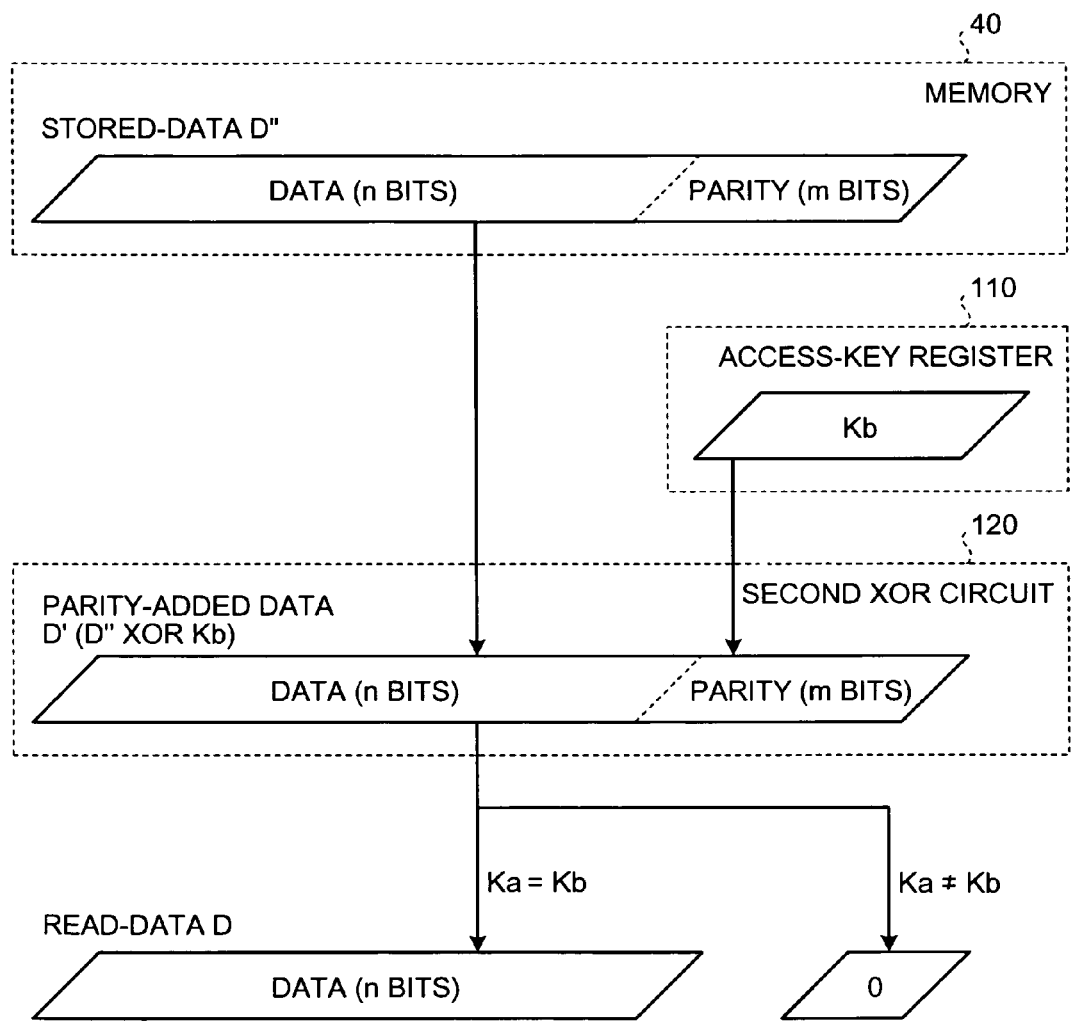
FIG. 7 is a schematic for explaining a process of reading the data from the memory.

As shown in FIG. 7, when the active process reads the data D from the memory 40, a value D" XOR Kb (=D' XOR Ka XOR Kb) equal to an XOR of the stored data D", namely D' XOR Ka, and an access key Kb written to the access-key register 110 by the process is calculated. The value to which the ECC performed the error check and the error correction based on the result of calculating by the syndrome calculating circuit 122 is read.

When the same access key is used for writing and reading (Ka=Kb), the correct data D can be read. When the access keys are different between reading and writing (Ka≠Kb), the stored data D" read from the memory 40 includes as many errors as the number of the bits in which Ka XOR Kb is equal to one. In such a case, the error correcting circuit 124 output the zero data.

When the access keys are different between reading and writing, the error correcting circuit 124 can output no data instead of the zero data.

The access key includes a value unique to the corresponding process. When a certain process tries to read data written by another process, the memory protecting apparatus 1 according to the first embodiment prevents the certain process from reading. In this manner, the memory protecting apparatus 1 protects the data from other processes.

A plurality of processes can share a single access key. By sharing the access key, the processes can share data and the data can be protected from other processes.

The access key can be any size equal to or less than the total of the data length (n bits) in the memory and the parity length (m bits), namely n+m bits.

The memory protecting apparatus 1 prevents an unauthorized process from reading the data as described above, and protects the data so that only an authorized process can write the data. More specifically, before writing the data to the memory 40, the memory protecting apparatus 1 reads the data in the memory 40. The memory protecting apparatus 1 takes control so that the data cannot be written to an address that the process cannot access for reading due to disagreement of the access key. This realizes the protection of the writing access by the small unit.

As a second embodiment of the present invention, the protection processing unit 10 in the memory protecting apparatus 1 can be an intellectual property (IP) to be installed into any type of system LSI instead of the independent LSI chip.

The memory protecting apparatus 1 according to the second embodiment is otherwise configured similarly to the memory protecting apparatus 1 according to the first embodiment.

Figure 8:
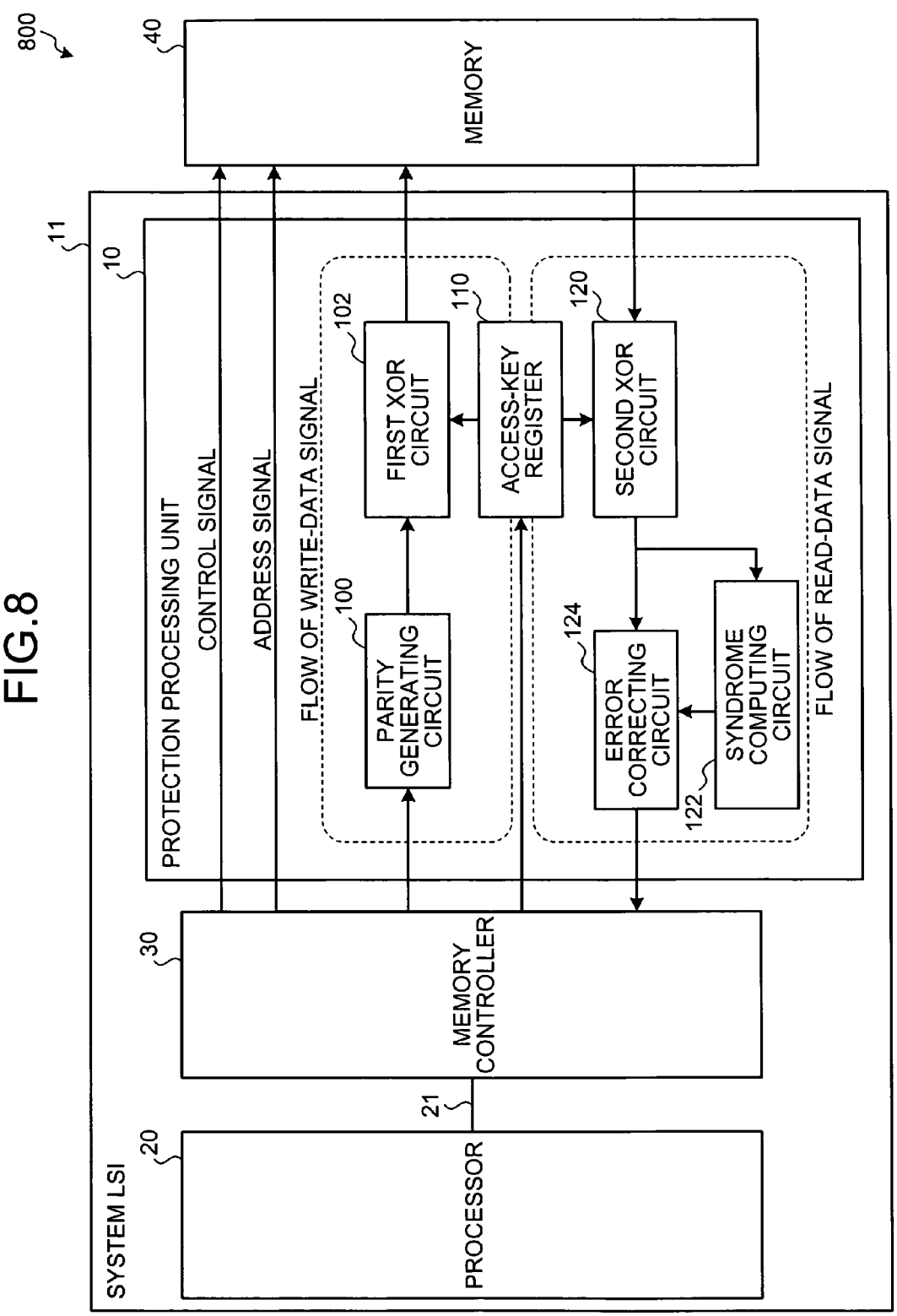
FIG. 8 is a block diagram of a memory protecting apparatus according to a third embodiment of the present invention.

As shown in FIG. 8, a memory protecting apparatus 800 according to a third embodiment of the present invention includes a system LSI 11 and the memory 40. The system LSI 11 includes the protection processing unit 10, the processor 20, and the memory controller 30.

The memory controller 30 converts protocols between the processor bus 21 and the memory 40. The protection processing unit 10 is embedded to connect the memory controller 30 and the memory 40. The protection processing unit 10 can be embedded as an additive function to the memory controller 30.

The memory protecting apparatus 800 is otherwise configured similarly to the memory protecting apparatus 1 according to the first embodiment.

Figure 9:
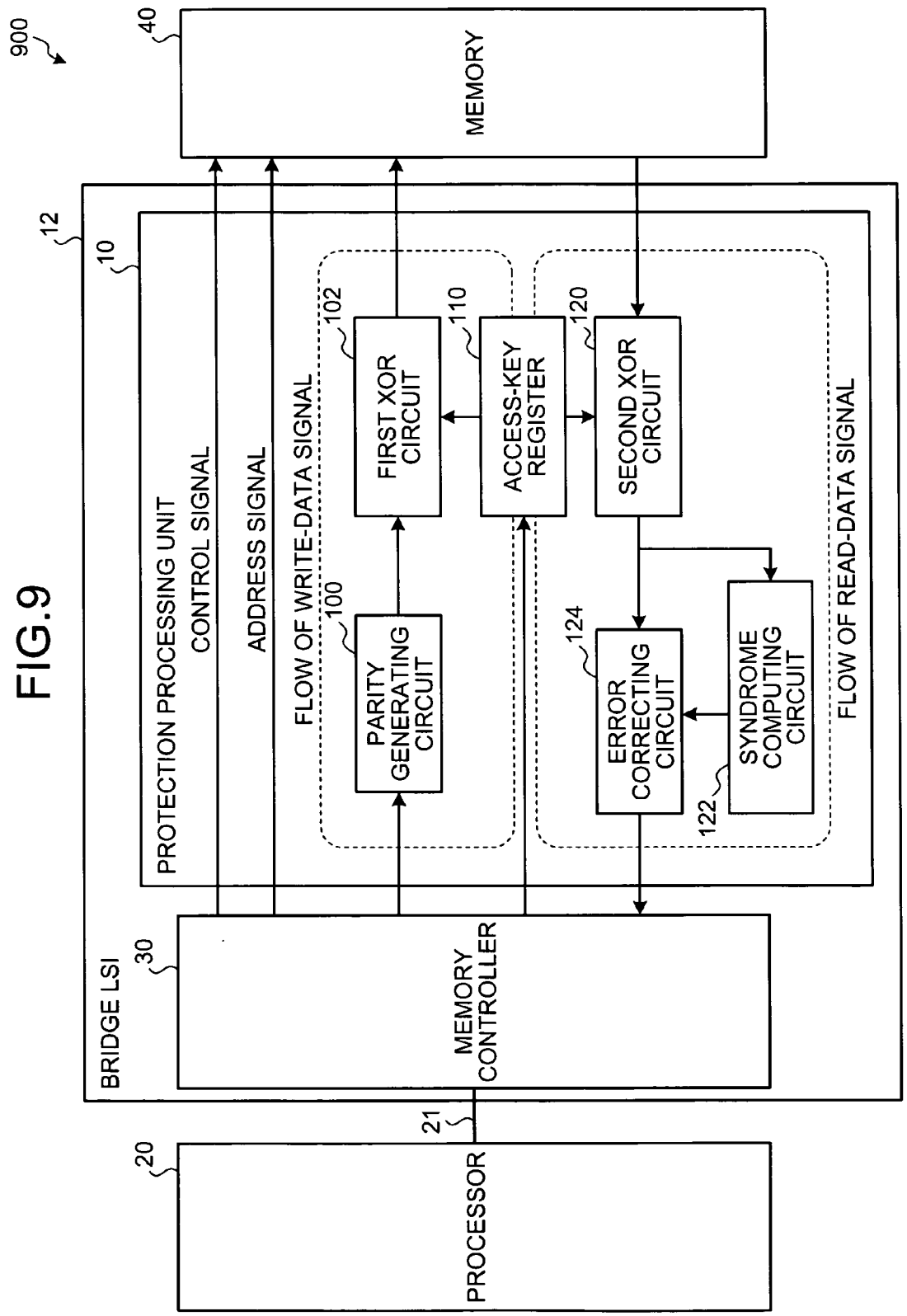
FIG. 9 is a block diagram of a memory protecting apparatus according to a fourth embodiment of the present invention.

As shown in FIG. 9, a memory protecting apparatus 900 according to a fourth embodiment of the present invention includes the processor 20, a bridge LSI 12, and the memory 40. The bridge LSI 12 includes the memory controller 30 and the protection processing unit 10.

The bridge LSI 12 is installed between the processor 20 and the memory 40 and connects the memory 40 and the processor 20.

The memory protecting apparatus 900 is otherwise configured similarly to the memory protecting apparatus 1 according to the first embodiment.

Figure 10:
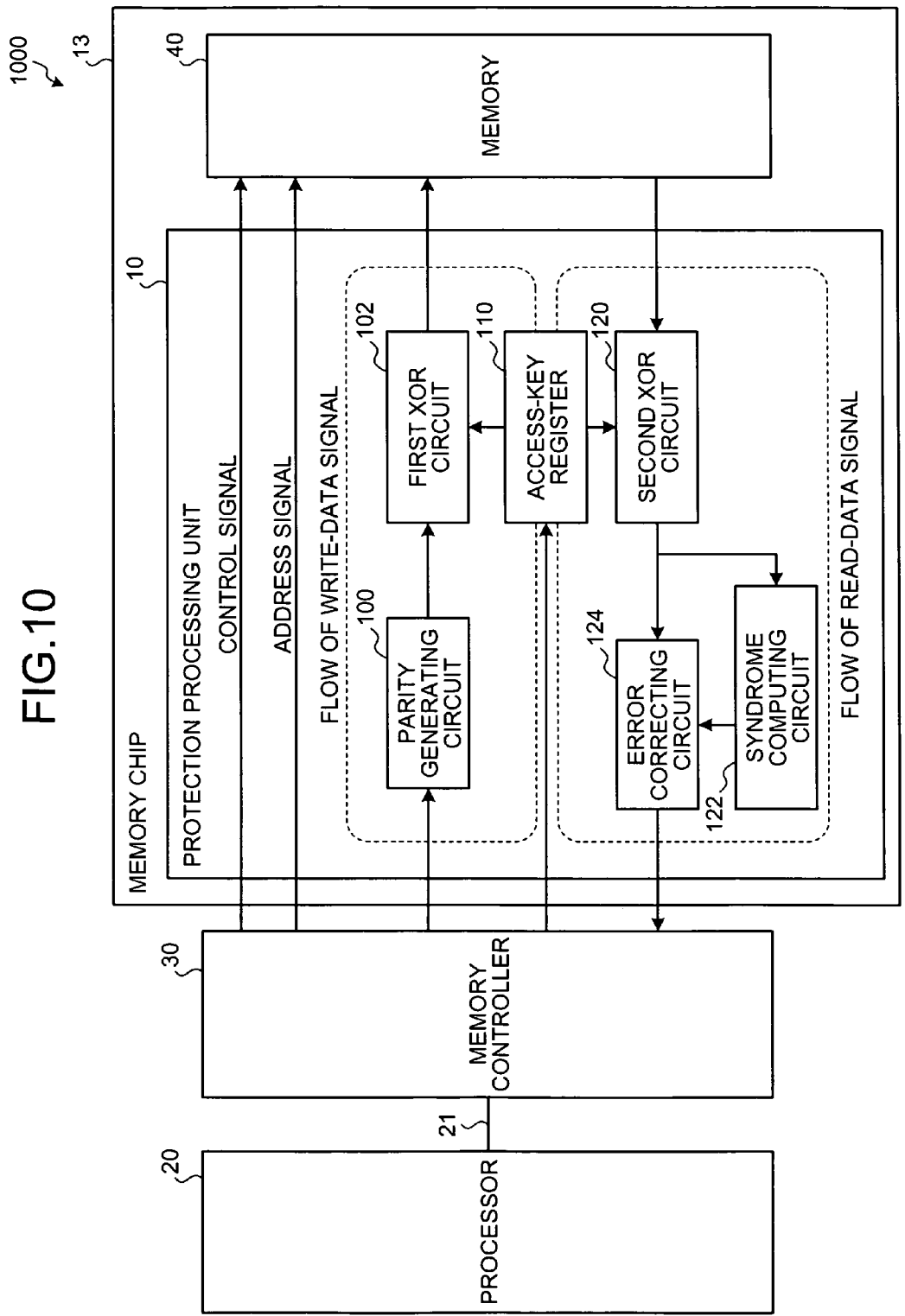
FIG. 10 is a block diagram of a memory protecting apparatus according to a fifth embodiment of the present invention.

As shown in FIG. 10, a memory protecting apparatus 1000 according to a fifth embodiment of the present invention includes the processor 20, the memory controller 30, and a memory chip 13. The memory chip 13 includes the protection processing unit 10 and the memory 40.

Because the protection processing unit 10 is coupled with the memory 40, the memory chip 13 can detect disagreement of the access keys and prevent the data from being read from the memory chip 13. The memory chip 13 can include the ECC circuit. If it is the case, the protection processing unit 10 in the memory chip 13 does not need to include the parity generating circuit 100, the syndrome calculating circuit 122, and the error correcting circuit 124. The ECC circuit in the memory controller 30 is used instead of them.

The memory protecting apparatus 1000 is otherwise configured similarly to the memory protecting apparatus 1 according to the first embodiment.

According to a sixth embodiment of the present invention, a single process can include a plurality of access keys, and a plurality of processes can share a single key.

When an access key different from the access key set to the access-key register 110 is required, the required access key is set to the access-key register 110. More specifically, for example, the operating system can set the required access key to the access-key register 110.

The memory protecting apparatus 1 according to the sixth embodiment is otherwise configured similarly to the memory protecting apparatus 1 according to the first embodiment.

According to a seventh embodiment of the present invention, the memory protecting apparatus 1 can prevent unauthorized accesses among a plurality of processors in multiprocessing. An access from an unauthorized processor can be prevented by setting the access keys with respect to each processor.

Furthermore, the memory protecting apparatus 1 can prevent unauthorized accesses between a process and an input/output (I/O) device, or unauthorized accesses among the process, the processor, and the I/O device.

The memory protecting apparatus 1 according to the seventh embodiment is otherwise configured similarly to the memory protecting apparatus 1 according to the first embodiment.

Figure 11:
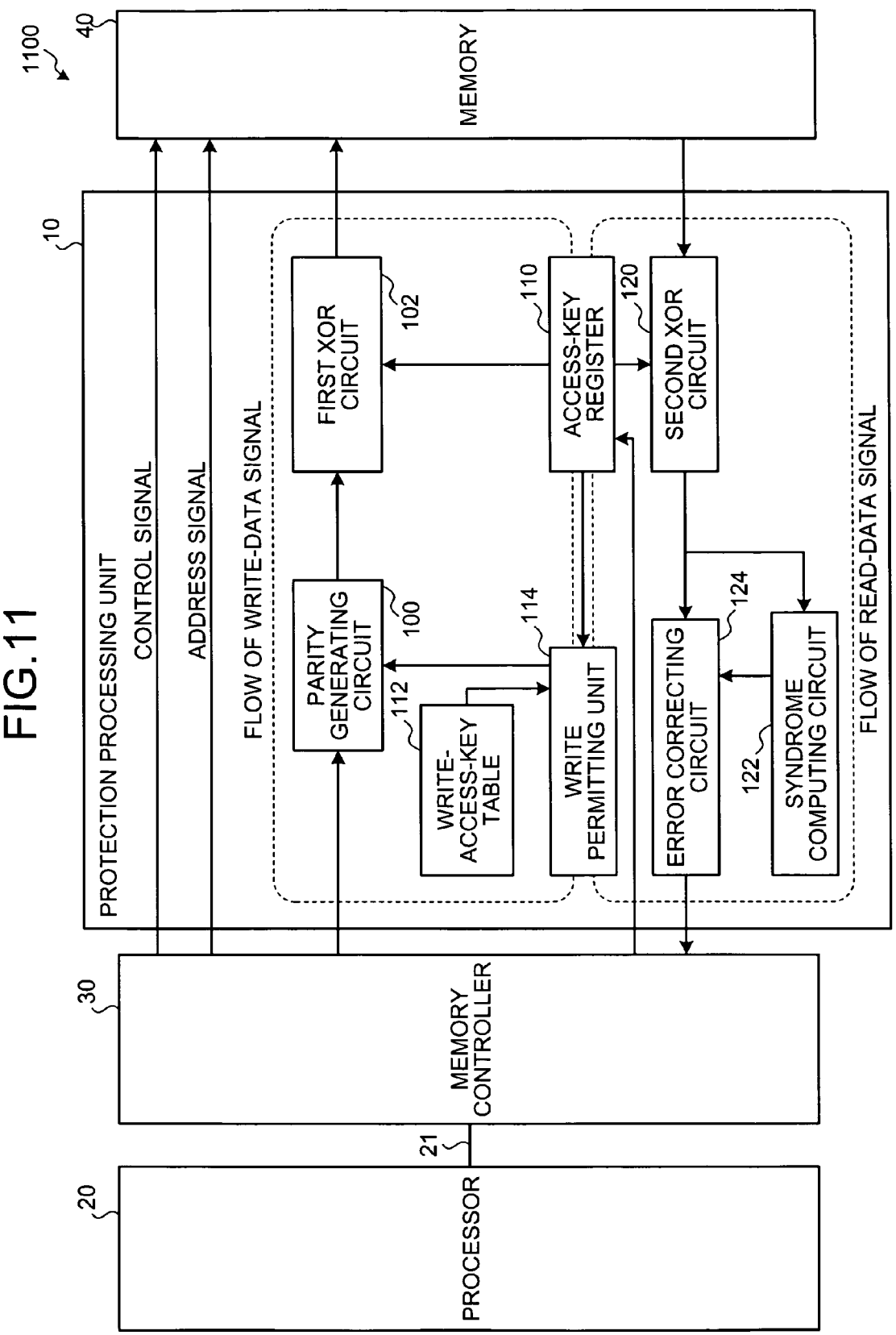
FIG. 11 is a block diagram of a memory protecting apparatus according to an eighth embodiment of the present invention.

As shown in FIG. 11, a memory protecting apparatus 1100 according to an eighth embodiment of the present invention further includes a write-access-key table 112 and a write permitting unit 114.

Figure 12:
FIG. 12 is a schematic of a data configuration in a write-access-key table.

As shown in FIG. 12, the write-access-key table 112 associates each of access keys with a memory-start address number and a memory-end address number. The write permitting unit 114 permits to write data to the memory area between the memory-start address number and the memory-end address number associated with the access key acquired from the processor 20, and prohibits writing data to any other area. The write-access-key table 112 is preferably generated by the operating system and stored in the protection processing unit 10.

The memory protecting apparatus 1100 is otherwise configured similarly to the memory protecting apparatus 1 according to the first embodiment.

Figure 13:
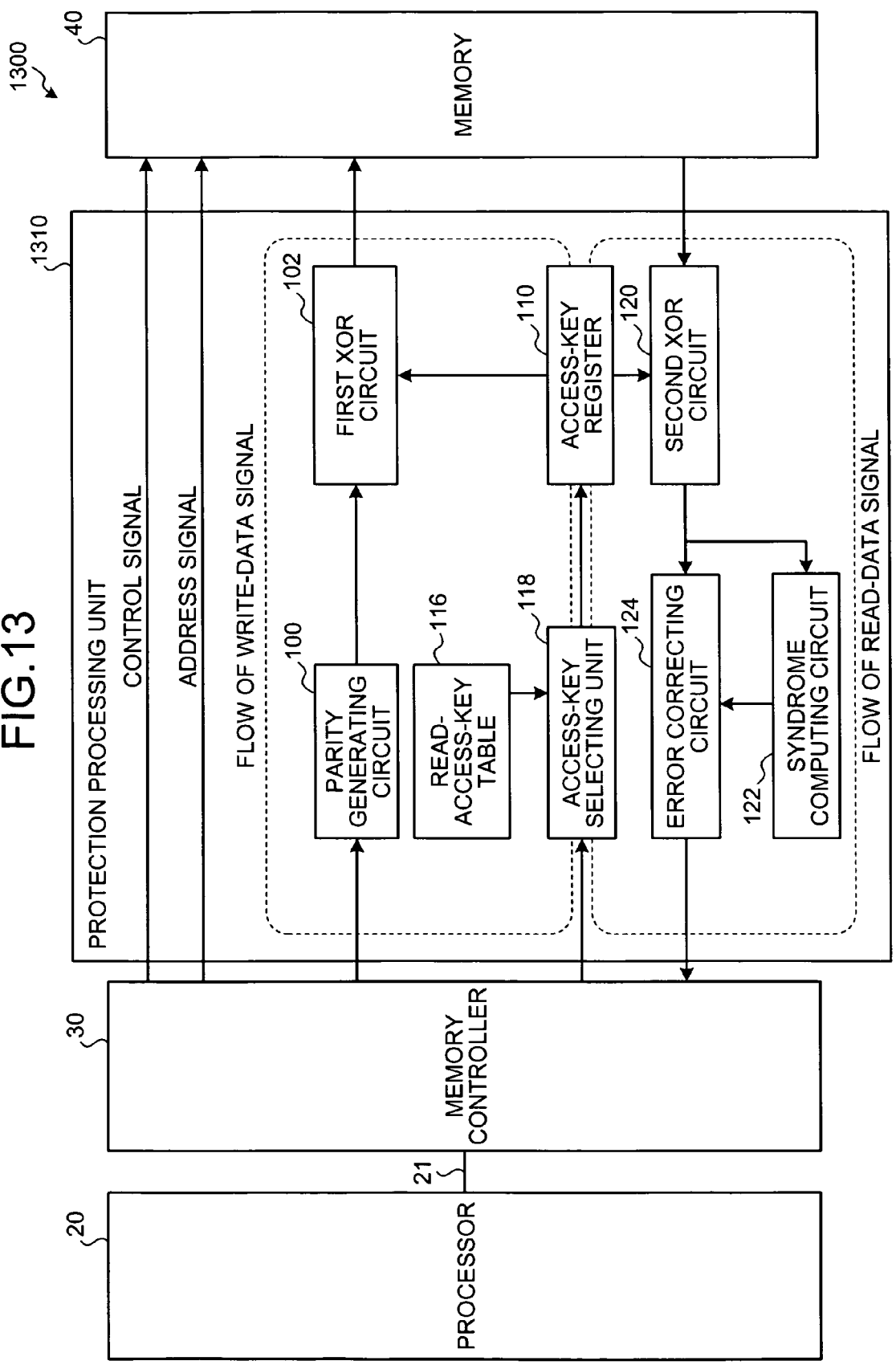
FIG. 13 is a block diagram of a memory protecting apparatus according to a ninth embodiment of the present invention.

As shown in FIG. 13, a protection processing unit 1310 in a memory protecting apparatus 1300 according to a ninth embodiment of the present invention further includes a read-access-key table 116 and an access-key selecting unit 118.

Figures 14, 15:
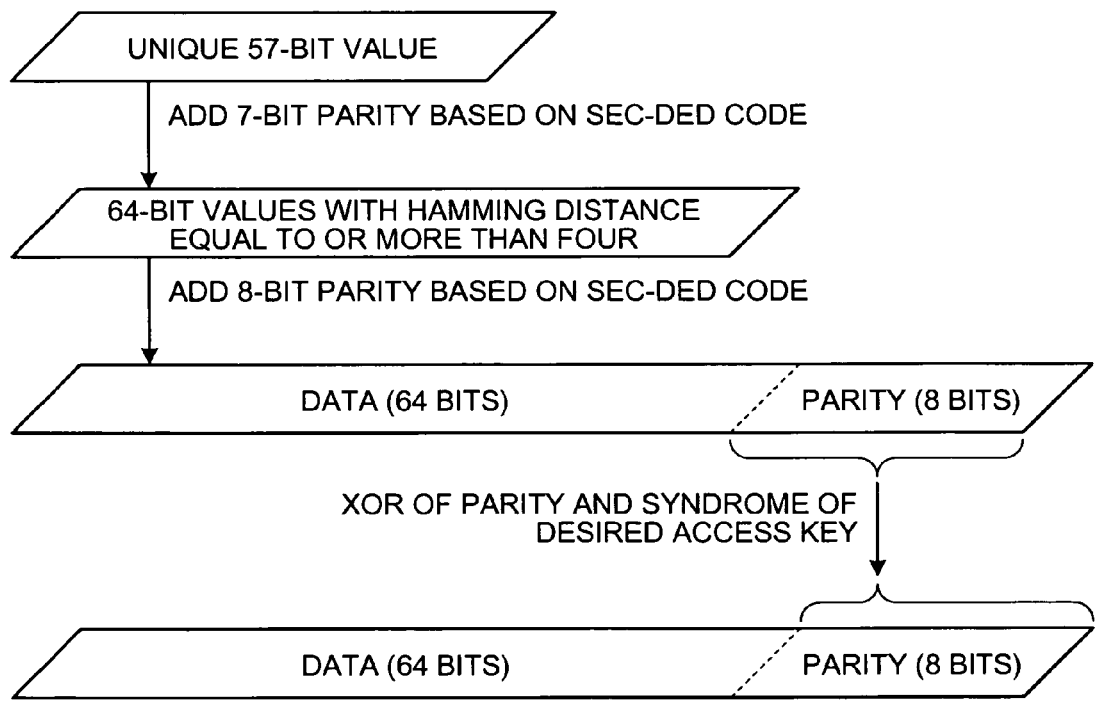
FIG. 14 is a schematic of a data configuration in a read-access-key table.
FIG. 15 is a schematic for explaining a method of selecting an access key.

As shown in FIG. 14, the read-access-key table 116 associates each of access keys with a memory-start address number. When the processor 20 specifies a certain memory-start address number, the access-key selecting unit 118 selects an access key associated with the memory-start address number, and sets the selected access key to the access-key register 110. The read-access-key table 116 is preferably set by the operating system.

As with the memory protecting apparatus 1 according to the first embodiment, the memory protecting apparatus 1300 protects the data from unauthorized processes. Furthermore, because each memory address is assigned with a unique access key, the data can be protected by a predetermined unit of the memory address.

Moreover, because the access keys are managed with respect to each memory address, an unauthorized access can be prevented even when processes do not correspond to access keys one to one as explained in the sixth embodiment.

The memory protecting apparatus 1300 is otherwise configured similarly to the memory protecting apparatus 1 according to the first embodiment.

A memory protecting apparatus 1 according to a tenth embodiment of the present invention sets each access key so that the ECC can detect reading with an incorrect access key different from an access key used for writing it.

To detect the reading with the incorrect access key by the ECC, access keys Ka and Kb are selected as described below so that the syndrome calculated by D' XOR Ka XOR Kb is always detected as double errors when data written with the arbitrary access key Ka is read with the access key Kb. A pair of access keys that can be detected as a single error is not desirable because the single error is corrected by the error correcting circuit 124.

When Hsiao SEC-DED code is used, the double errors are detected when the number of bits indicative of one in the syndrome is even and equal to or more than two. The access keys Ka and Kb are selected so that the number of bits indicative of one in the syndrome is even and equal to or more than two.

In order that the syndrome calculated by D' XOR Ka XOR Kb is always detected as double errors, the access keys Ka and Kb need to be determined so that the number of bits indicative of one in the syndrome calculated from Ka XOR Kb is even and equal to or more than two.

Moreover, in order that the number of bits indicative of one in the syndrome calculated by Ka XOR Kb is always even and equal to or more than two, the following two requirements need to be satisfied. The first requirement is to select the access keys Ka and Kb so that a syndrome calculated from access key Ka is different from a syndrome calculated from access key Kb. The second requirement is that the numbers of bits indicative of one in the syndromes calculated from respective access keys are fixed to be even or odd.

For example, when the 64-bit data is added with the 8-bit data and the access keys are selected according to the requirements, the number of access keys that can be present at a time is equal to the number of the syndromes that can be represented by eight bits and that include an even (or odd) number of bits indicative of one, namely 128.

A single access key can be as long as 72 (64+8) bits. There can be 128 access keys that satisfy the requirements of the syndrome present in a space of two to 72nd power access keys at a time.

The memory protecting apparatus 1 according to the tenth embodiment is otherwise configured similarly to the memory protecting apparatus 1 according to the first embodiment.

A memory protecting apparatus 1 according to an eleventh embodiment of the present invention sets an access key that prevents the data in the memory 40 from being improperly read. According to other embodiments, the memory protecting apparatus 1 stores therein the information for the ECC and the information for protecting the memory 40 overlapped by the XOR. Therefore, as long as the correct access key is used to read the data, the error detection and correction based on the ECC operates normally, where a single error is corrected and double errors are detected.

However, when the data is read with an incorrect access key different from an access key used at writing it and an error or two occurs in the memory at the same time, the data can be read as if the correct access key is used for reading or as if a single error is detected. In such cases, the data can be improperly read.

To avoid such a risk, access keys are selected so that a Hamming distance between any two access keys is equal to or more than four. The Hamming distance is the number of different bits between two values. As described in the tenth embodiment, the access keys Ka and Kb need to be determined so that the number of bits indicative of one in the syndrome calculated from Ka XOR Kb is even and equal to or more than two.

Based on the requirement, the Hamming distance can be two. However, if the Hamming distance is two and a single error occurs in the memory, a single error is corrected and another single error is detected. The detected single error is corrected and the data is output, which is not desirable in this case. For this reason, the Hamming distance needs to be equal to or more than four.

Summing up the requirements, desirable access keys are selected so that the syndromes calculated from respective access keys are different, the numbers of bits indicative of one in the syndromes calculated from respective access keys are fixed to be even or odd, and the Hamming distance between the two access keys is equal to or more than four.

When the Hamming distance is equal to or more than four, the data read with a different access key always includes at least four errors. Even if an error or two occurs, at least two errors are detected in the data. This prevents unauthorized process from reading the correct data by an improper correction of a single error.

A method of selecting an access key based on the requirements described above is explained referring to FIG. 15. The explanation is given assuming that the unit of the memory access is 64 bits, the Hsiao SEC-DED code is used, and an 8-bit parity is added to a 64-bit data. The method applies to other cases that the access is made to a different size of memory and that another ECC method is used.

A 57-bit number is prepared as a seed of the access key. The number is selected so that a plurality of access keys that is present at the same time is different from one another. The numbers are generated by a counter or the like as needed.

Otherwise, the number can be selected by generating random numbers and selecting a unique number among them. The 57 bits can be separated into a plurality of areas and the random numbers or the counter can be used to select a value in each area. It is desirable to use the number as close to a random number as possible in view of security.

A parity based on the SEC-DED code is added to the 57-bit value. Due to the nature of the SEC-DED code, this provides the Hamming distance equal to or more than four between 64-bit values each including a different 57-bit value added with a 7-bit parity. A location of the 7-bit parity in the 64-bit value is determined in advance. The parity does not need to be the last seven digits.

An 8-bit parity is added when the 64-bit value is written to the memory 40. The 8-bit parity is calculated and added to the 64-bit value to generate a 72-bit value. The syndrome calculated from the 72-bit value is zero.

A syndrome desired to correspond to the access key is determined. As described above, in the case of the 8-bit parity, the valid access key is selected from among the 128 numbers each including an even (or odd) number of bits indicative of one. The syndrome of the access key needs to be different from a syndrome of any other access key. To select an access key that generates a unique syndrome, it is desirable to manage the access keys using a table or the like.

Based on the Hsiao SEC-DED code, a column vector is one in a single row and it is zero in other rows in the parity check matrix corresponding to the parity bit location. In other words, each bit in the 8-bit parity corresponds to each bit in the 8-bit syndrome one to one.

An inversion of a single bit in the parity inverts the corresponding bit in the syndrome. Therefore, an XOR of the parity in the 72-bit value and the desired access key is calculated and embedded in the parity area of the 72-bit value. The syndrome of the access key generated in this manner satisfies the requirements.

The memory protecting apparatus 1 according to the eleventh embodiment is otherwise configured similarly to the memory protecting apparatus 1 according to the first embodiment.

Figure 16:
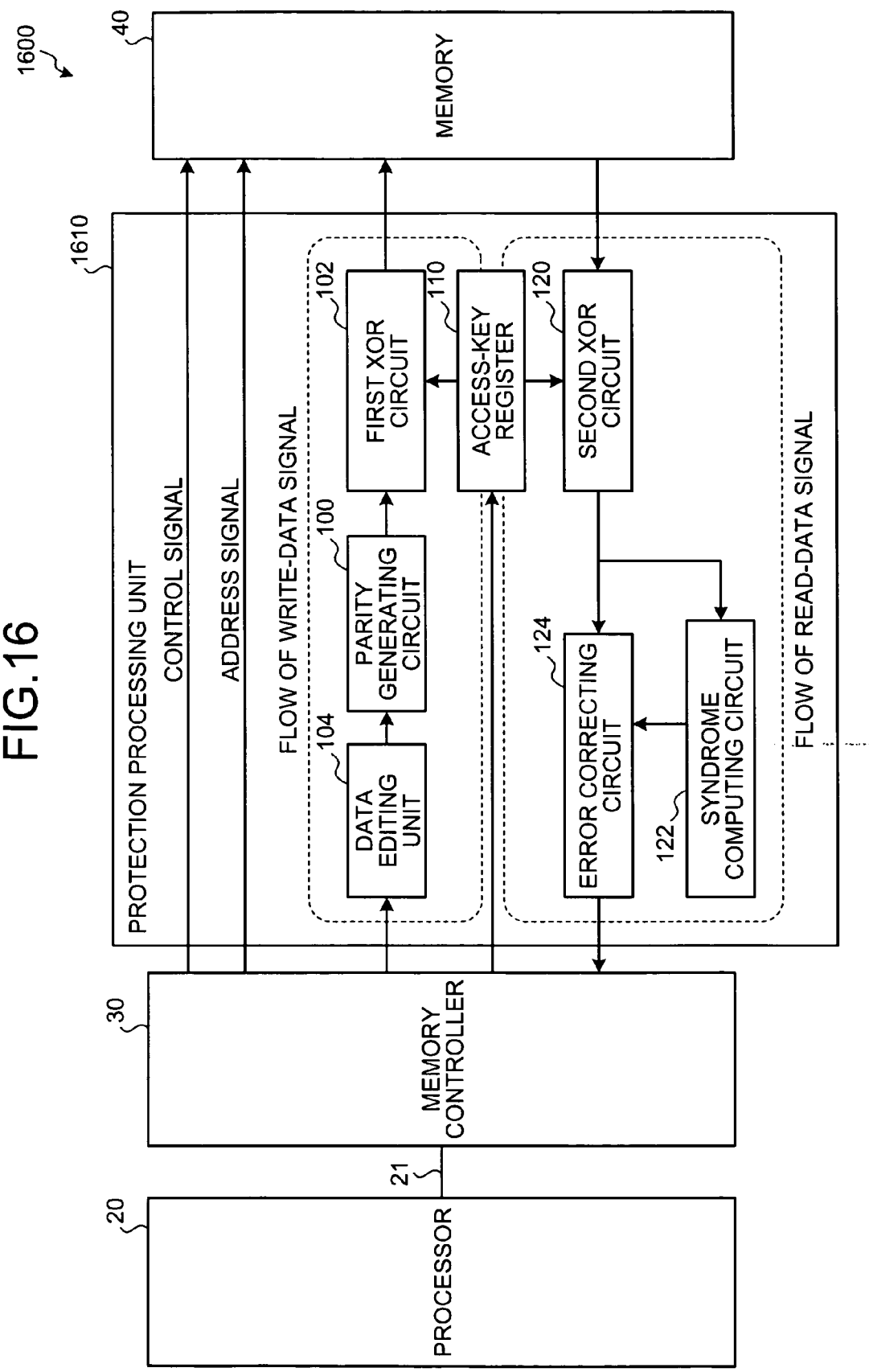
FIG. 16 is a block diagram of a memory protecting apparatus according to a twelfth embodiment of the present invention.

As shown in FIG. 16, a protection processing unit 1610 in a memory protecting apparatus 1600 according to a twelfth embodiment of the present invention further includes a data editing unit 104.

As described above, accesses from other processes can be prevented by storing the XOR of the parity and the access key in the memory 40. However, there is a risk that double errors can be detected as triple errors (or a single error) due to a memory error and the data can be corrected and output. If it is the case, correct data cannot be read; however, the read data includes partially correct data.

The memory protecting apparatus 1600 stores therein data in a form manageable when the partially correct data is read out.

As shown in FIG. 17, the data editing unit 104 represents a single bit x using four bits of a, b, c, and d. In other words, the single-bit value is described by four words. The word herein is defined as a unit of the ECC. When the memory 40 includes the ECC by the unit of 64 bits, a single word includes 64 bits.

Any single-bit value is selected as each of a, b, c, and d so that they satisfy x=a XOR b XOR c XOR d for a bit value x to be recorded. It is desirable that the four values are selected at random as irregularly as possible.

The selected four values of a, b, c, and d are stored in different words. In FIG. 17, the values are stored in words W1, W2, W3, and W4.

The values a and b are stored in a bit location xi. The values c and d are stored in a bit location xi−1.

While the bit location xi is recorded with a and b in the words W1 and W2, zero is recorded in xi of the word W3 and one is recorded in xi of the word W4.

Similarly, the bit location xi−1 is recorded with zero in the word W1 and one in the word W2.

For example, there can be a memory error that the value one is read from any one of the. words indicative of zero and one when a permanent fault occurs to the bit location xi.

In this case, when one bit is divided into four single-bit values a, b, c, and d, and each value is recorded in one of the bit locations xi and xi−1, zero in the bit location xi of the word W3 inverts to one and an error is detected in the word W3. As a result, the value c cannot be detected, and therefore the bit value x that can be calculated by the XOR using c cannot be acquired. Even when the correct data is read despite the memory error, possibility of restructuring the recorded data is further reduced. In this manner, the memory protecting apparatus 1600 reduces probability of reading all of the four words.

An arrangement of the four bits a, b, c, and d is not limited to the twelfth embodiment. The bit locations have only to satisfy the following conditions. All of the four bits are different values, and at least one of the four bits is located in a different bit location. Moreover, any one of zero and one is recorded in the same bit location as another bit value in another word.

Furthermore, two bit locations do not have to be adjacent, and the four words do not have to be successive.

The memory protecting apparatus 1600 is otherwise configured similarly to the memory protecting apparatus 1 according to the first embodiment.

The access keys are generated by the protection processing unit in a memory protecting apparatus 1800 according to a thirteenth embodiment of the present invention.

Figure 18:
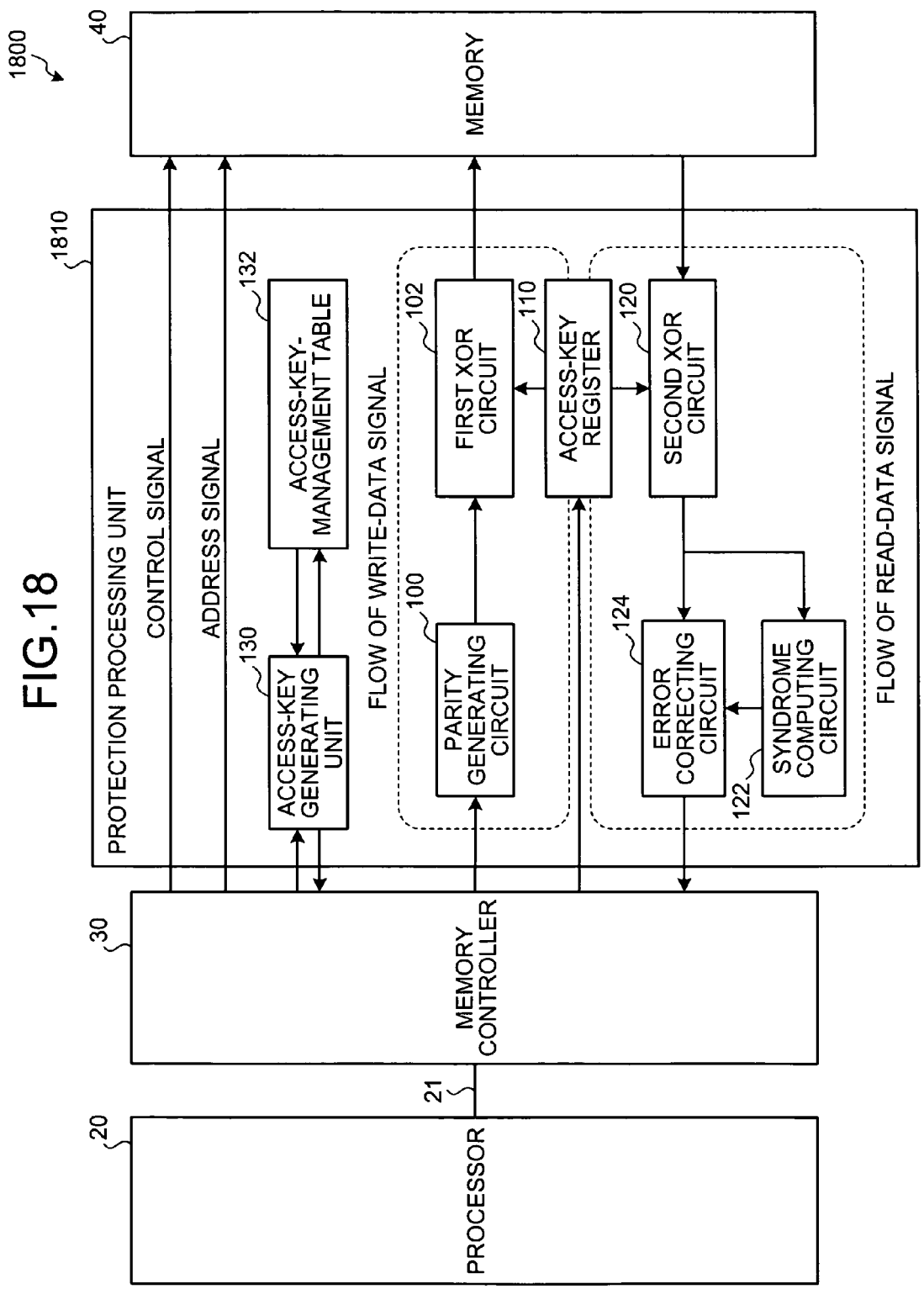
FIG. 18 is a block diagram of a memory protecting apparatus according to a thirteenth embodiment of the present invention.

As shown in FIG. 18, a protection processing unit 1810 in the memory protecting apparatus 1800 according to the thirteenth embodiment further includes an access-key generating unit 130 that generates the access keys and an access-key-management table 132 that retains the access keys generated by the access-key generating unit 130.

The access-key generating unit 130 acquires an instruction to generate a new access key from the processor 20 via the memory controller 30. Upon acquiring the instruction, the access-key generating unit 130 generates random numbers, and generates the access key based on the random numbers. The access key is preferably generated in the method explained in any one of the tenth and eleventh embodiment. To prevent using an access key identical to an existing access key, the access-key generating unit 130 generates the access key that is different from any one of the access keys retained in the access-key-management table 132.

The access-key generating unit 130 returns the generated access key to the processor 20 via the memory controller 30 and registers it to the access-key-management table 132 at the same time. The processor 20 accesses the memory 40 using the acquired access key.

The memory protecting apparatus 1800 is otherwise configured similarly to the memory protecting apparatus 1 according to the-first embodiment.

When the access key is returned to the processor 20, the access key is managed by a processor operating system, and applications can find the access key. To avoid such a risk, a memory protecting apparatus 1 according to a fourteenth embodiment of the present invention returns an access key identification (ID) that identifies the corresponding access key instead of returning the access key itself.

The protection processing unit 1810 in the memory protecting apparatus 1800 according to the fourteenth embodiment includes an access-key ID table that associates access keys to access key IDs. The protection processing unit 1810 uses the access-key ID table to identify the access key based on the access key ID and sets the access key to the access-key register 110. Because software on the processor 20 cannot identify the actual value of the access key, this improves security of the data.

Moreover, the access-key ID table can be stored in the memory 40 using a special access key. This prevents processes from referencing the access-key ID table unless the process has the special ID table, resulting in improved security. It is preferable that the special access key can be referenced by the protection processing unit 1810 alone and not used by any other processes.

The memory protecting apparatus 1800 according to the fourteenth embodiment is otherwise configured similarly to the memory protecting apparatus 1800 according to the thirteenth embodiment.

As explained in the tenth embodiment, to add the 8-bit parity to the 64-bit data, the maximum number of valid access keys is 128. A memory protecting apparatus 1 according to a fifteenth embodiment of the present invention combines a plurality of access keys to increase the number of valid access keys without changing data width in the memory.

Many processors include a cache memory and read a plurality of words from the cache memory at a time. For example, assuming that the cache line size is 256 bits, the processor sequentially reads four 64-bit words from the cache memory.

In other words, the data in the cache memory is sectioned by the unit of 256 bits and read by the unit. Four access keys are assigned to four words that are sequentially read. The memory protecting apparatus 1 according to the fifteenth embodiment provides control so that none of the four words is read if the access key disagrees even with one of the four words. This achieves a high effect as if 128 to the fourth power access keys are used.

The memory protecting apparatus 1 according to the fifteenth embodiment is otherwise configured similarly to the memory protecting apparatus 1 according to the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for protecting a memory, comprising:
a parity generator that generates a parity of first data to be written to the memory;
a parity adder that obtains a second data by adding the parity to the first data;
an access-key register that holds an access key unique to a source of request for writing data to the memory or for reading data from the memory, the access key being set by the source of request and being used for accessing the memory; a first operating unit that obtains a third data by calculating an XOR between the second data and the access key, the access key being set in the access-key register by the source of request for writing data to the memory;
a writing unit that writes the third data to the memory;
a second operating unit that obtains a fourth data by calculating an XOR between the access key and the third data, the access key being set in the access-key register by the source of request for reading data from the memory;
a syndrome calculator that calculates a syndrome from the third data; and
a determining unit that determines whether to output the third data as the first data, based on calculated syndrome.

2. The apparatus according to claim 1, further comprising:
a write-access-key table that stores a memory address area of the memory in association with the access key; and
a write permitting unit that permits a write of the third data to the memory address area associated with the access key set by the source of request in the write-access-key table, wherein
the writing unit writes the third data to the memory address area to which the writing of the third data is permitted.

3. The apparatus according to claim 1, further comprising:
a read-access-key table that stores a memory address of the memory in association with the access key; and
a key selecting unit that, upon receiving a designation of the memory address from the source of request, selects the access key associated with designated memory address from the read-access-key table, wherein
the access-key register holds selected access key.

4. The apparatus according to claim 1, further comprising:
a data editing unit that generates data-representing a single-bit data to be written to the memory by an XOR of four bits of data, locating each of the four bits in different words, locating a first bit and a second bit in a first bit location, locating a third bit and a fourth bit in a second bit location, respectively locating zero and one in the second bit location of the words that include the first bit and the second bit, and respectively locating zero and one in the first bit location of the words that include the third bit and the fourth bit, wherein
the parity generator generates the parity for each of the words obtained by the data editing unit.

5. The apparatus according to claim 1, wherein
the second operating unit performs the XOR operation of the access key and the third data, upon acquiring a request for writing the first data from the source of request, and
the parity generator generates the parity for the first data when the determining unit determines to output the third data as the first data based on the calculated syndrome.

6. The apparatus according to claim 1, wherein
the source of request is either one of a processor and a process.

7. The apparatus according to claim 1, further comprising:
an acquiring unit that acquires an instruction to generate the access key from the source of request;
a key generator that generates the access key unique to the source of request upon acquiring the instruction; and
a key transmitting unit that transmits generated access key to the source of request.

8. The apparatus according to claim 7, wherein
the key generator generates the access key for each of a plurality of words corresponding to a unit of accessing the memory by the source of request.

9. The apparatus according to claim 7, wherein
the key generator generates the access key that satisfies a condition that is syndrome detected as double errors even when the syndrome is calculated from an XOR between the second data, an access key to be generated, and any one of existing access keys.

10. The apparatus according to claim 9, wherein
the key generator generates the access key so that a Hamming distance between the access key to be generated and any one of the existing access keys is equal to or more than four.

11. A system for protecting a memory, the system comprising:
a processor;
a memory controller; and
a memory protecting apparatus that protects an external memory, wherein the memory protecting apparatus includes
a parity generator that generates a parity of first data to be written to the memory;
a parity adder that obtains a second data by adding the parity to the first data;
an access-key register that holds an access key unique to a source of request for writing data to the memory, the access key being set by the source of request and being used for accessing the memory or for reading data from the memory;
a first operating unit that obtains a third data by calculating an XOR between the second data and the access key, the access key being set in the access-key register by the source of request for writing data to the memory;
a writing unit that writes the third data to the memory;
a second operating unit that obtains a fourth data by calculating an XOR between the access key and the third data, the access key being set in the access-key register by a source of request for reading data from the memory;
a syndrome calculator that calculates a syndrome from the third data; and
a determining unit that determines whether to output the third data as the first data, based on calculated syndrome.

12. A system for protecting a memory, the system comprising:
a memory controller; and
a memory protecting apparatus that protects an external memory, wherein
the memory protecting apparatus includes
a parity generator that generates a parity of first data to be written to the memory;
a parity adder that obtains a second data by adding the parity to the first data;
an access-key register that holds an access key unique to a source of request for writing data to the memory or for reading data from the memory, the access key being set by the source of request and being used for accessing the memory;
a first operating unit that obtains a third data by calculating an XOR between the second data and the access key, the access key being set in the access-key register by the source of request for writing data to the memory;
a writing unit that writes the third data to the memory;
a second operating unit that obtains a fourth data by calculating an XOR between the access key and the third data, the access key being set in the access-key register by a source of request for reading data from the memory;
a syndrome calculator that calculates a syndrome from the third data; and
a determining unit that determines whether to output the third data as the first data, based on calculated syndrome.

13. A system for protecting a memory, the system comprising:
a memory; and
a memory protecting apparatus that protects the memory, wherein
the memory protecting apparatus includes
a parity generator that generates a parity of first data to be written to the memory;
a parity adder that obtains a second data by adding the parity to the first data;
an access-key register that holds an access key unique to a source of request for writing data to the memory or for reading data from the memory, the access key being set by the source of request and being used for accessing the memory;
a first operating unit that obtains a third data by calculating an XOR between the second data and the access key, the access key being set in the access-key register by the source of request for writing data to the memory;
a writing unit that writes the third data to the memory;
a second operating unit that obtains a fourth data by calculating an XOR between the access key and the third data, the access key being set in the access-key register by a source of request for reading data from the memory;
a syndrome calculator that calculates a syndrome from the third data; and
a determining unit that determines whether to output the third data as the first data, based on calculated syndrome.

14. A method of protecting a memory, the method comprising:
generating a parity of first data to be written to the memory;
obtaining a second data by adding the parity to the first data;
setting an access key unique to a source of request for writing data to the memory or for reading data from the memory in an access-key register, the access key being set by the source of request and being used for accessing the memory;
obtaining a third data by calculating an XOR between the second data and the access key, the access key being set in the access-key register by the source of request for writing data to the memory;
writing the third data to the memory;
obtaining a fourth data by calculating an XOR between the access key and the third data, the access key being set in the access-key register by the source of request for reading data from the memory;
calculating a syndrome from the third data; and
determining whether to output the third data as the first data, based on calculated syndrome.

15. The method according to claim 14, further comprising:
acquiring an instruction to generate the access key from the source of request;
generating the access key unique to the source of request upon acquiring the instruction; and
transmitting generated access key to the source of request.

16. The method according to claim 14, further comprising:
permitting a write of the third data to a memory address area associated with the access key set by the source of request in a write-access-key table that stores the memory address area of the memory in association with the access key; and
the third data to the memory address area to which the writing of the third data is permitted.

17. The method according to claim 14, further comprising:
selecting unit that, upon receiving a designation of a memory address from the source of request, the access key associated with designated memory address from a read-access-key table that stores the memory address of the memory in association with the access key; and
holding selected access key.

18. The method according to claim 14, further comprising:
generating data representing a single-bit data to be written to the memory by an XOR of four bits of data, locating each of the four bits in different words, locating a first bit and a second bit in a first bit location, locating a third bit and a fourth bit in a second bit location, respectively locating zero and one in the second bit location of the words that include the first bit and the second bit, and respectively locating zero and one in the first bit location of the words that include the third bit and the fourth bit; and generating the parity for each of generated words.

19. The method according to claim 14, further comprising:
performing the XOR operation of the access key and the third data, upon acquiring a request for writing the first data from the source of request; and generating the parity for the first data when the determining unit determines to output the third data as the first data based on the calculated syndrome.

20. The method according to claim 14, wherein
the source of request is either one of a processor and a process.

* * * * *